May 11, 1965
C. E. TAYLOR ETAL
3,183,288
METHOD FOR EXTRUDING
Filed Dec. 21, 1961
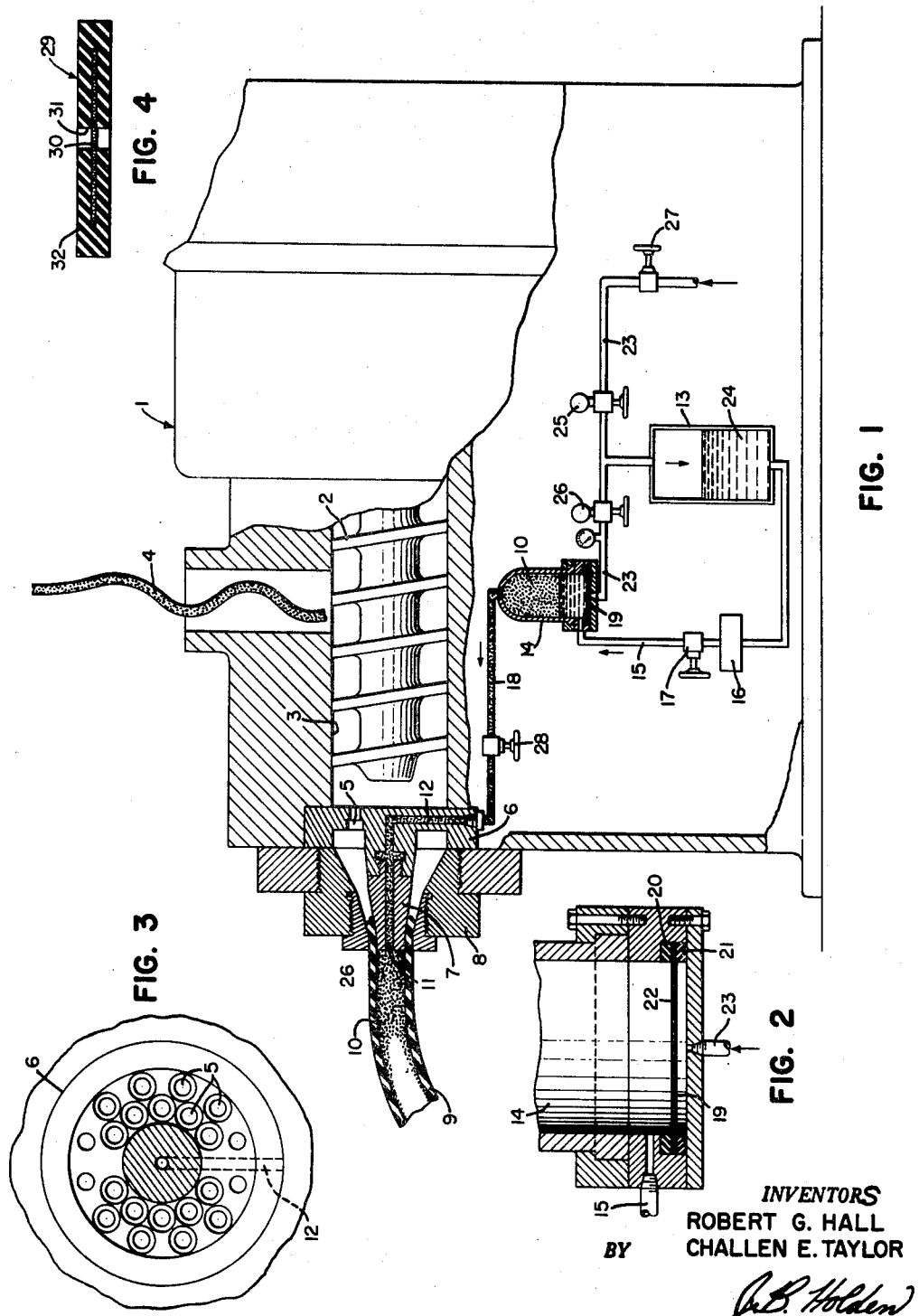
INVENTORS
ROBERT G. HALL
CHALLEN E. TAYLOR
BY
J. B. Holden
ATTORNEY

United States Patent Office 3,183,288
Patented May 11, 1965

3,183,288
METHOD FOR EXTRUDING
Challen E. Taylor, Waukegan, and Robert George Hall, Libertyville, Ill., assignors to The Goodyear Tire & Rubber Company, Akron, Ohio, a corporation of Ohio
Filed Dec. 21, 1961, Ser. No. 160,981
2 Claims. (Cl. 264—130)

This invention relates to a method for lubricating the interior surface of an extrusion as it leaves the extruder.

In the process of extruding from rubber or plastic continuous lengths of tubular or closed cross section such as hose, inner tubes, sealing gaskets, etc., it is usually necessary to insert a lubricant of some type into the interior of the extrusion to coat the surface so as to prevent sticking together when collapsed. Soapstone, mica dust, zinc stearate and other dry dust lubricants have been used extensively for this purpose as well as various liquid lubricants on occasion, but it is apparent that the dust and contamination from such lubricants creates a very substantial problem both in the cleanliness and appearance of the extrusion and complications in the additional procesing required on some extrusions. In many instances it is necessary to provide additional means to gather the excess dust or liquid lubricants as it is not possible to use the minimum amount and be assured of thorough lubrication.

It has been found that a liquid lubricant such as soap which has been aerated to produce a foam of the lubricant, provides not only an excellent lubricant but also eliminates substantially all contamination and cleanliness problems. The foam also provides a very uniform lubricating film over the entire surface since it clings well and on disintegration, leaves no surplus of lubricating material. This eliminates the need for additional equipment to collect the excess or loose material and as a result reduces waste and eliminates the usual untidiness of the surrounding work area. The apparatus to aerate the lubricant is simple in construction and may be attached to the extruder in place of the present apparatus used for the other types of lubricants without any substantial modification. It is, therefore, an object of this invention to provide a new and novel method of lubricating the interior of a hollow extrusion as it is extruded.

Another object of the invention is to provide a method for such lubrication that eliminates much of the usual contamination and dust encountered.

A further object of the invention is to provide a simple and inexpensive method to create the lubricant.

A still further object of the invention is a method of providing a more uniform and positive lubrication of the interior of an extrusion.

Another object of the invention is to provide a method that makes it possible to use a minimum of lubricant for a thorough lubrication and eliminate the necessity of collecting or disposing of the excess.

These and other objects and advantages of this invention will become apparent hereinafter as the description thereof proceeds, the novel features, arrangements and combinations being clearly pointed out in the specification as well as the claims thereunto appended.

In the drawings:

FIG. 1 is a schematic and partial sectional plan view illustrating the invention;

FIG. 2 is a detailed sectional view showing a portion of the invention;

FIG. 3 is an end view of a portion of the apparatus; and

FIG. 4 is a modification of a portion of the apparatus.

For the purposes of illustration, in FIG. 1 a typical screw extruder 1 is illustrated in which the extruder screw 2 lies in barrel 3. The rubber or plastic material is fed in the form of a ribbon 4 into barrel 3 and is forced by the screw 2 through the openings 5 in the spider 6 at the end of the barrel 3. Projecting outwardly and centrally from spider 6 is a mandrel 7 which along with the extruder die 8 forms the extruded tube 9 as the material is extruded from the machine. As shown, the spider 6 and portion thereof containing openings 5 is an integral structure but as in many extruders, the spider and breaker plate (portion having openings) are separate parts assembled in the desired relation. The mandrel and die set-up is of conventional construction used in conjunction with extruders for the manufacture of tubing or other extruded hollow extrusions and the set-up illustrated is only shown as an example.

In order to lubricate the interior surface of the tube 9 a foam 10 of an aerated liquid material is continuously passed into the interior of the extruded tube 9 as it leaves the extrusion die 8. The foam 10 enters the interior of tube 9 by means of passageway 11 in mandrel 7 generally extending axially from the outlet end into the spider 6 to connect with passageway 12 therein which extends out of the spider radially between the openings 5 to the exterior periphery thereof. The openings 5 in spider 6, as best seen in FIG. 3, provide the means for the rubber in the extruder barrel 3 to pass into the extruder die and mandrel assembly. In many presently used extruders, passageway 12 is included in spider 6 for use in inserting the usual lubricants into the interior of an extruded tube.

In order to provide the aerated lubricant, an apparatus such as seen in FIG. 1 may be used. A reservoir 13 holding a supply of liquid lubricating material such as soap is mounted adjacent the extruder. A foam generator 14 is connected to the reservoir 13 by means of tubing 15 which as shown includes a filter 16 to remove any foreign particles in the liquid lubricant as it passes from the reservoir 13 to the generator 14. A valve 17 preferably is also included in the tubing 15 to more accurately control the amount of liquid lubricant flowing between the reservoir 13 and the generator 14. It has been found that by heating the liquid lubricant in reservoir 13 in any desired manner that the foam generation is improved but in many instances this is not necessary.

The generator 14, as shown, is a closed container with a connecting tube 18 joining the top of the container to the end of passageway 12 in spider 6. Adjacent the bottom of the generator 14 is a foam generator screen 19. In the form shown in FIG. 2 the foam generating screen 19 is made up of rings 20 and 21 of resilient material such as rubber around the opposite sides of the periphery of a foraminous element 22. As shown, foraminous element 22 covers substantially the cross sectional area of generator 14 and is spaced from the bottom thereof so that air pressure as will be explained later, can enter the liquid material over the entire area of the generator. Foraminous element 22 is of a material such as heavy twill cloth although fine screen or other types of foraminous material may be used. The screen 19 is clamped snugly in the foam generator 14 and tubing 15 is connected to the side of the foam generator 14 so that the liquid material enters the foam generator 14 immediately above the foam generating screen 19. It has been found that satisfactory foam generation occurs when the liquid soap level in the generator is approximately one-third of the volume of generator 14.

In order to assure uniform flow of the lubricant to the generator, air pressure is applied in the reservoir to the surface of the liquid through pressure line 23 from a source of compressed air (not shown) to maintain the liquid lubricant 24 under a predetermined constant pressure. Regulator 25 is used to control the amount of pressure on the liquid lubricant 24 in reservoir 13.

To generate or convert the liquid lubricant into foam, be placed in a flexible container or bag 30, the bag sealed, the air completely removed from the bag and the sealed bag placed in an autoclave where heat and pressure are applied. When vacuum is applied to an opening in the bag through a valve 32, there is a tendency for the flexible bag to seal itself around the valve, thus preventing the air from being evacuated from the interior of the bag surrounding the glass assembly. Air remaining within the bag during autoclaving tends to become entrapped within the plastic interlayer, thus causing air bubbles to develop within the assembly.

In order to insure that all the air within the bag is removed, a flexible irregularly surfaced material such as a woven screen 34, made of a synthetic organic copolymer of vinyl chloride and vinylidene chloride, known commonly as Saran plastic, is inserted within the bag to extend from the area adjacent the laminated assembly to the valve. Saran is an ideal material for this purpose, because it does not tend to mold during the pressing operation, thus enabling it to be used repeatedly. In addition, the plastic screen is soft and pliable and amenable to bending such as shown in FIGURE 5. Thus, it does not cut or protrude through the bag nor exert local stresses on the edge of the laminate with which it comes into contact during the autoclaving operation.

In placing the assembly within the flexible bag, the Saran screen is inserted therewithin in overlapping relation to a margin of the glass-plastic reinforced assembly. The assembly must be placed within the bag in spaced relation to the valve in order to avoid having the valve mar the assembly in the autoclave. Conventional clamping screws 36 are provided to force a bar 38 adjacent a flange 40 of the clamp 36 in order to seal the edge of the autoclave bag after the latter is loaded with the assembly and the screening.

The particular embodiments of the apparatus disclosed herein are for purposes of illustration rather than limitation. For example, the pressing plates, while preferably of thick glass, may also be composed of other rigid materials, such as metallic sheets or rigid ceramic sheets other than glass. Also, the plastic screening 34 may be of a material other than Saran, provided it has sufficient rigidity to provide an air passage between the inserted laminate and the air valve 32, sufficient flexibility to be inserted in bent form, and sufficient softness and chemical durability to refrain from harming the flexible autoclave bag either mechanically or chemically.

While the teachings of the present invention have been described particularly in relation to glass-plastic sandwiches having a single plastic interlayer, it is understood that the present invention is equally adapted for use in preventing the occurrence of optical defects in the fabrication of multiplate assemblies comprising a plurality of plastic interlayers each sandwiched between a pair of glass sheets. In such use, the thickness of each exterior glass plate in the laminate determines the rigidity required for the pressing plates. The interior glass sheets are reinforced by the portions of the laminate exterior thereto, so that the thickness of the interior sheets does not affect the thickness required for the pressing plate. The use of the rigid yet resilient member 34 is also required in multiplate lamination.

This application is a continuation of my application Serial No. 424,852, filed on April 22, 1954, and entitled "Method of Manufacturing Glass-Plastic Laminates," now abandoned.

I claim:

1. A method of producing a laminated assembly comprising at least two sheets of glass and at least one interlayer of plastic material, said assembly having thin exterior bowed tempered glass sheets, comprising applying rigid glass pressing plates having at least about twice the thickness of the thin exterior bowed sheets with flat faces of the plates against the latter, inserting the assembly together with the rigid glass pressing plates in a pliable bag, sealing the bag, evacuating the sealed bag with the pressing plates and the assembly therein, and applying heat and pressure to adhere the plastic interlayer to the adjacent glass sheets.

2. In a method of manufacturing glass-plastic laminates from composite assemblies, each having at least one thin exterior bowed sheet of glass, involving the application of heat and pressure to complete the seal between the intermediate layer of transparent plastic material and a pair of glass sheets at least one of which is a thin exterior bowed sheet of glass for each composite assembly, the improvement comprising placing one flat face of a rigid pressing plate against an exposed surface of each thin exterior bowed sheet of each composite assembly to be laminated, inserting at least one assembly with each exposed surface of each thin exterior bowed sheet abutted by the flat face of a rigid pressing plate within a flexible bag, sealing the bag and evacuating the sealed bag containing the assembly and the rigid pressing plate therein prior to applying heat and pressure to the assembly within the bag.

3. In the method described in claim 2, the improvement wherein each rigid pressing plate is a sheet of glass at least approximately twice the thickness of the thin exterior sheet of the laminated assembly in contact therewith.

No references cited.